Dec. 30, 1969  B. SCHUBERT  3,486,405
METHOD AND APPARATUS FOR MANIPULATING ROD-LIKE ARTICLES
Original Filed Nov. 10, 1964  9 Sheets-Sheet 5

INVENTOR:
Bernhard Schubert
by Michael S. Striker
Attorney

Dec. 30, 1969   B. SCHUBERT   3,486,405
METHOD AND APPARATUS FOR MANIPULATING ROD-LIKE ARTICLES
Original Filed Nov. 10, 1964   9 Sheets-Sheet 6

INVENTOR:
Bernhard Schubert
by Michael J. Striker
Attorney

3,486,405
METHOD AND APPARATUS FOR MANIPULATING ROD-LIKE ARTICLES
Bernhard Schubert, Hamburg-Lohbrugge, Germany, assignor to Hauni-Werke Korber & Co. K.G., Hamburg-Bergedorf, Germany
Original application Nov. 10, 1964, Ser. No. 410,167. Divided and this application Dec. 14, 1966, Ser. No. 601,603
Claims priority, application Great Britain, Nov. 11, 1963, 44,338/63
Int. Cl. B26d 7/06
U.S. Cl. 83—102      13 Claims

ABSTRACT OF THE DISCLOSURE

Method and apparatus for transferring filter plugs and like relativley short rod-shaped articles from a first path, in which the articles are arranged in a series of rows and move sideways, into a remote second path in which the articles move sideways. The transfer of articles takes place by resorting to a series of tubular guides and to mechanical and/or pneumatic means serving to displace articles from the first path, to move the articles lengthwise through the guides, and to transfer the foremost articles from such guides into the second path.

CROSS-REFERENCES TO RELATED APPLICATIONS

This is a division of my copending application Ser. No. 410,167, filed Nov. 10, 1964, now abandoned. The copending application claims a method and apparatus for producing composite mouthpieces for cigarettes or the like by converting rows of coaxial but closely adjacent rod-shaped articles of a first type into rows of coaxial but spaced rod-shaped articles so that articles of a second type may be introduced into the gaps between the spaced articles of the first type. The thus obtained rows which contain articles of the first type alternating with articles of the second type are then wrapped to form composite mouthpieces of multiple unit length.

BACKGROUND OF THE INVENTION

The present invention relates to a method and apparatus for manipulating rod-shaped articles. More particularly, the invention relates to a method and apparatus which may be utilized in mass-production of composite mouthpieces for filter cigarettes, cigars, cigarillos and other tobacco-containing products. Still more particularly, the invention relates to improvements in a method and apparatus for orderly transfer of relatively short rod-shaped articles from a first into a remote second path with simultaneous regrouping of articles.

In the production of composite mouthpieces of multiple unit length, groups of rod-shaped sections consisting of different filter materials are shuffled to form assemblies of coaxial rod-shaped articles wherein sections consisting of different materials alternate with each other. Such assemblies are thereupon wrapped in adhesive-coated sheet material to form composite mouthpieces of multiple unit length which are ready to be subdivided into sections of double unit length and to be fed between pairs of coaxial tobacco rods. In forming the groups of sections, filter rods consisting of two or more different filter materials are subdivided into stacks of coaxial sections and the sections of each stack are moved axially and away from each other to provide between the adjoining sections gaps each of which is wide enough to accommodate a section of different material. However, such methods of forming gaps between the adjoining sections of a stack are impractical when the space which is available in a filter machine does not allow for placing various conveyors (which effect sidewise and axial movement of sections as well as shuffling of different groups of sections) into immediate proximity of each other. For example, it can happen that the areas where the filter rods are subdivided into sections are distant from each other and from the area where the groups are shuffled to form assemblies which are ready for wrapping. It can also happen that a single magazine or a single conveyor must feed filter rods or filter rod sections to several filter machines which are located at a considerable distance from each other. Furthermore, conventional filter machines normally utilize holders in the form of semicylindrical troughs or pockets with which the filter rod sections advance sideways and in which the sections are shifted axially to form groups ready for shuffling, or to condense assemblies consisting of two or more interdigitated groups. It was found that certain types of filter rod material are hard to move axially in such types of pockets, especially if the sections are very short, and such axial shifting of short sections in semicylindrical pockets may result in deformation or destruction of sections. On the other hand, the pockets must be open since the means for effecting axial displacement of articles normally consists of cams which are fixedly secured to the frame of the apparatus and extend into the path of advancing articles.

Accordingly, it is an important object of the present invention to provide an apparatus for manipulating sections of filter rods and similar rod-like articles in such a way that the articles may be guided and advanced in very long paths without danger of deformation, undesirable reorientation or destruction, that the articles may be assembled into groups containing any desired number of coaxial but spaced articles which are ready for shuffling with groups of articles consisting of a different material, and that the article-forming station may be located at a substantial distance from the group forming station without in any way affecting the efficiency, speed and/or accuracy of the apparatus.

Another object of the invention is to provide an arrangement for transforming a series of closely adjacent files of travelling parallel rod-shaped articles into a single file or into a series of spaced files of such articles.

A further object of the invention is to provide a displacing mechanism for changing the direction of movement and the distribution of rod-shaped articles in an orderly fashion and in such a way that a very large number of such articles may be processed per unit of time.

An additional object of the invention is to provide an improved system of guides for rod-shaped articles, particularly for comparatively short sections of filter rods and similar rod-like or stick-shaped bodies.

Still another object of the invention is to provide a filter machine which embodise an apparatus of the above outlined characteristics.

A further object of the invention is to provide a method of forming groups of coaxial but spaced rod-shaped articles, particularly for forming groups which are ready to be shuffled with similarly arranged groups containing articles which consist of a different material.

Another object of the invention is to provide a method of the just outlined characteristics according to which the articles may be guided, advanced and their direction of movement changed while moving in restricted paths so that each article is fully protected against deformation or undesirable reorientation.

An additional object of the invention is to provide a process for the production of composite mouthpieces of multiple unit length wherein one type of rod-shaped sections which are utilized in the mouthpieces may be manipulated in accordance with my method.

Still another object of the invention is to provide a method of repeatedly changing the direction of rod-like articles in orderly fashion and with utmost precision to avoid jamming, deformation, destruction and other defects which could result in reduced output of an apparatus for the production of composite mouthpieces or filter cigarettes.

SUMMARY OF THE INVENTION

One feature of the invention resides in the provision of an apparatus for manipulating sections of filter rods or similar rod-shaped articles. The apparatus comprises a supply conveyor having a series of holder means each arranged to support and to advance sideways a row of at least two coaxial rod-shaped articles, a plurality of tubular guides each having an outlet remote from and an inlet adjacent to successive holder means, displacing means for displacing the articles lengthwise from the holder means into the guides and for advancing the thus displaced articles lengthwise through the respective guides, a receiving conveyor having a series of article-receiving holders arranged to move the articles sideways, and transfer means for delivering articles from the outlets of the guides into the holders of the receiving conveyor.

The method of my invention comprises the steps of conveying successive rows of coaxial rod-shaped articles sideways in the holder means of the supply conveyor, moving the articles of such rows lengthwise in a plurality of elongated confining paths defined by the tubular guides, and conveying the foremost articles in each such path sideways first by the transfer means and thereupon in the holders of the receiving conveyor.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
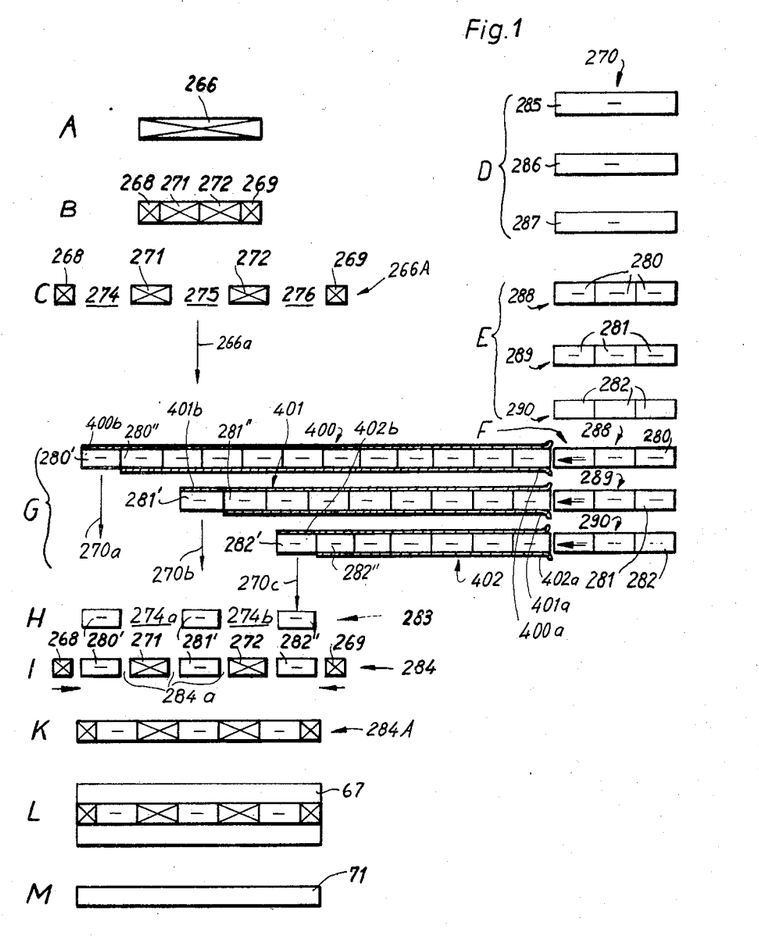
FIG. 1 illustrates a series of steps in a method of making duplex mouthpieces of multiple unit length which may be mass-produced in the apparatus of my invention.

FIG. 1 illustrates a series of steps which may be carried out with the apparatus of my invention to produce composite mouthpieces 71 of sextuple unit length. The step A includes moving a filter rod 266 (hereinafter called white filter rod) sideways, i.e., in a direction at right angles to its axis. The step B includes subdividing the rod 266 into four coaxial closely adjacent rod-like articles including two white end filters 268, 269 of unit length and two intermediate white sections 271, 272 of double unit length. In the step C, the filters 268, 269 and sections 271, 272 are shifted axially and away from each other to form three gaps 274, 275, 276 of at least double unit length whereby the unit length of the gaps need not be the same as the length of end filters 268, 269. The thus shifted rod-like articles form a group 266A which is advanced sideways as indicated by an arrow 266a.

In the step D, a single file 270 of three parallel equidistant filter rods 285, 286, 287 (hereinafter called black filter rods because their material is different from the material of the white filter rod 266) is advanced sideways, i.e., downwardly as viewed in FIG. 2. In the step E, the black filter rods 285–287 are subdivided to respectively yield stacks or rows 288, 289, 290 each consisting of a plurality of coaxial rod-like articles or sections 280, 281, 282 of double unit length. It will be noted that the number of black sections 280, 281 or 282 equals the number of gaps 274–276 between the rod-like articles of the group 266A.

In the step F, the stacks or rows 288, 289, 290 are respectively advanced lengthwise, i.e., in the axial direction of their rod-like articles, by moving end-to-end in three separate restricted paths defined by elongated tubular guides 400, 401, 402 which comprise inlets 400a–402a and outlets 400b–402b. The outlets 400b–402b are parallel to each other and are staggered axially and transversely so that the foremost sections 280', 281', 282' which are momentarily located in the respective outlets are automatically staggered with reference to each other. Such foremost sections are arrested at the time they enter the corresponding outlets (see the step G) and are thereupon transferred sideways as indicated by arrows 270a, 270b, 270c (step H). When the step H is completed, the foremost sections 280', 281', 282' form a row or group 283 of coaxial sections which are separated by gaps 274a, 275a of at least double unit length. In the step I, the groups 266A and 283 are shuffled with each other to form an assembly 284 wherein white end filters and sections alternate with black sections because the sections 271, 272 have entered the gaps 274a, 275a and the black sections 280'–282' have entered the gaps 274–276. As a rule, the width of gaps 274–276 will exceed the length of a black section and the width of gaps 274a, 275a will exceed the length of a white section; therefore, the articles forming the assembly 284 will be separated from each other by narrow clearances 284a. If such clearances are to be eliminated, the assembly 284 is condensed or shortened by shifting the end filter 268 axially toward the end filter 269, by shifting the end filter 269 toward the end filter 268, or by shifting both end filters axially toward each other. This step is indicated at K and the resulting shortened or condensed assembly 284A is then ready to be wrapped into a rectangular sheet 67 of adhesive-coated wrapper material (see the step L) which will transform the assembly 284A into a composite duplex mouthpiece 71 of sextuple unit length (step M).

If the clearances 284a are to remain (so as to form turbulence chambers between the end faces of adjoining rod-shaped articles), the assembly 284 is immediately wrapped into a sheet of adhesive-coated material to form with the sheet a mouthpiece which is somewhat longer than the mouthpiece 71. Thus, the step K may be dispensed with.

It will be noted that the outlets 400b, 401b, 402b register with the gaps 274, 275, 276 so that the foremost black sections 280', 281', 282' are automatically aligned with such gaps and, once removed from the guides 400–402, need not be shifted axially while advancing to the shuffling station (step I). It is also clear that the method shown in FIG. 1 may be modified by starting with white and black filter rods of quadruple unit length so that the group of white rod-shaped articles (see the step C) will comprise a single intermediate section of double unit length and will have only two gaps. In such instances, the method is carried out by using only two tubular guides. On the other hand, if the method is to be used in the production of composite mouthpieces of eight, ten or more times unit length, the groups of white rod-shaped articles will include three or more intermediate sections of double unit length and the number of guides will equal the number of gaps between the end filters and sections of a group of white rod-shaped articles. It is further obvious that, once the groups 266A and 283 are shuffled with each other, the next group 266A (not shown in FIG. 1) is shuffled with the black sections 280''–282'' which are then the foremost sections in the guides 400–402 and are advanced into the outlets 400b–402b, and so forth. The black sections in the guides 400–402 may but need not be arranged end-to-end, as long as a foremost section enters the corresponding outlet in good time to be ready for sidewise movement to the shuffling station whenever the shuffling station receives a fresh group 266A. The outlets 400b–402b are equidistant from each other and the distance between the front end faces of the sections 280' and 281' equals the length of a black section plus the width of the gap 274a. The same holds true for the distance between the front end faces of the black sections 281' and 282'. In some instances, all of the outlets will be aligned with each other so that the foremost sections 280'–282' will register and will be transferred in a single file for introduction into the gaps between successive pairs of cigarette rods of unit length.

Figure 2:
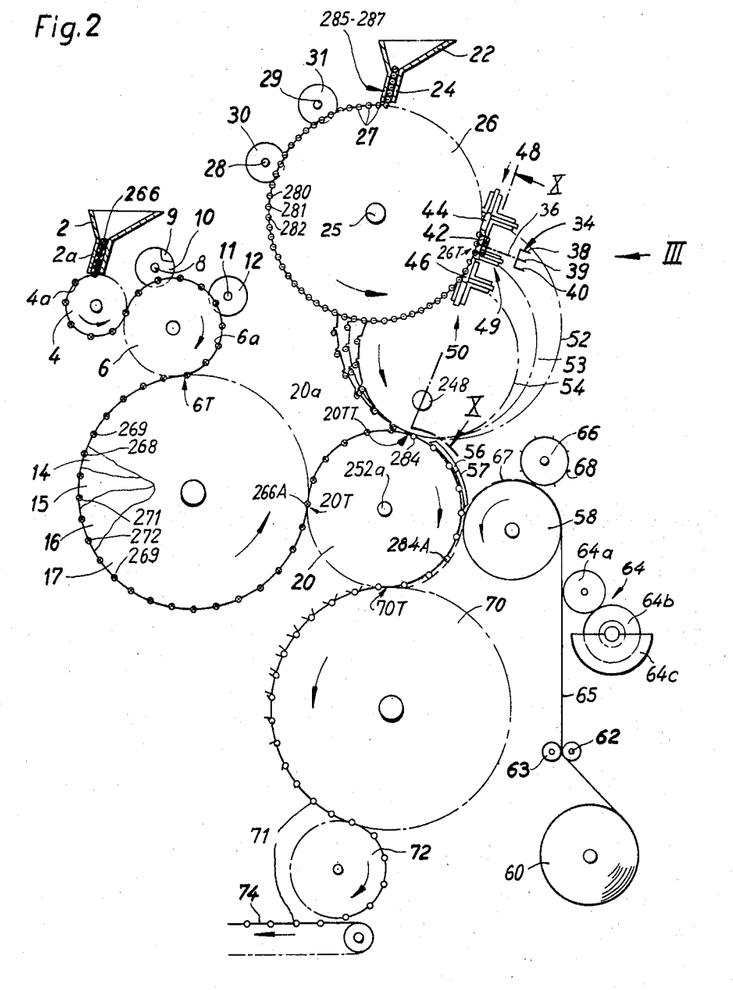
FIG. 2 is a diagrammatic end elevational view of an apparatus which is constructed in accordance with a first embodiment of my invention and is utilized for carrying out the method of FIG. 1.

One form of apparatus which may be utilized for practicing the method of my invention is illustrated in FIG. 2. This apparatus comprises a source here shown as a magazine 2 which accommodates a supply of white filter rods 266 and is provided with an inclined chute 2a arranged to discharge the filter rods seriatim into consecutive equidistant holders 4a of an inserting conveyor 4 here shown as a rotary drum whose holders are provided with axially parallel peripheral pockets or troughs. The drum 4 delivers the rods 266 into consecutive holders 6a of an intermediate conveyor 6 which also resembles a rotary drum and cooperates with three rotary disk-shaped cutters 9, 10 and 12. The cutters 9, 10 are mounted on a common drive shaft 8 and serve to subdivide each rod 266 into a pair of end filters 268, 269 and a white section of quadruple unit length (corresponding to the combined length of white sections 271, 272 shown in FIG. 1). The cutter 12 is mounted on a drive shaft 11 and serves to subdivide the sections of quadruple unit length into pairs of sections 271, 272. In other words, the drums 4, 6 will carry out the step A and the cutters 9, 10, 12 will carry out the step B shown in FIG. 1. The step C is performed by four inclined spreading or shifting disks 14, 15, 16, 17 whose axially parallel peripheral holders respectively receive the end filters 268, sections 271, sections 272 and end filters 269 of successive white filter rods 266 and deliver them to a transfer station 20T at which the thus obtained groups 266A enter consecutive holders 20a of an assembly conveyor or receiving conveyor 20. This receiving conveyor is a drum whose periphery is adjacent to the peripheries of spreading disks 14–17 at the station 20T and which serves to shuffle the groups 266A with groups 283 of black filter rod sections. The manner in which the disks 14–17 will spread the end filters and sections of white filter rods 266 is the same as disclosed, for example, in U.S. Patent No. 3,142,372 to Wiese. Thus, the holders of these disks are closely adjacent to each other while moving along the transfer station 6T and are thereupon caused to move apart sufficiently to form the gaps 274–276 not later than at the time they reach the station 20T.

A second source or magazine 22 accommodates a supply of black filter rods 285–287 which are to form a series of single files or rows 270. Such filter rods are discharged through an inclined chute or outlet 24 of the magazine 22 and enter immediately successive holders 27 of a supply conveyor 26 here shown as a rotary drum which is driven by a shaft 25 to rotate in a counterclockwise direction and advances the black filter rods past two rotary disk-shaped cutters 31, 30 which are respectively mounted on drive shafts 29, 28. The cutters 31, 30 sever each black filter rod in two axially staggered planes so that a file 270 of three consecutive black filter rods 285, 286, 287 will yield three rows of black sections 280, 281, 282 which travel toward a transfer station 26T. At this station, the rows of sections 280–282 are delivered into the inlets 400a–402a of tubular guides 400–402 by a feeding device 34 which forms part of a displacing unit and whose construction and operation will be described in connection with FIGS. 3 to 6. It suffices to say here that the feeding device 34 causes the sections 280, 281, 282 to enter the inlets 400a, 401a, 402a and that the guides 400, 401, 402 cooperate with an advancing device which also forms part of the aforementioned displacing unit and a portion of which is illustrated in FIG. 7. The advancing device serves to advance the sections into the outlets 400b–402b.

The foremost sections of the rows of sections in the guides 400, 401, 402 are thereupon transferred by three transfer conveyors 52, 53, 54 which move the sections sideways and on to a transfer station 20TT where the groups 283 enter successive holders 20a of the receiving drum 20 to be shuffled with the groups 266A and to form the assemblies 284. The assemblies 284 are condensed by two suitably inclined arcuate condensing cams 56, 57 which are adjacent to the periphery of the receiving drum 20 and engage the end filters 268, 269 so that, once it has moved past the cams 56, 57, each holder 20a of the receiving drum accommodates a condensed assembly 284A. The receiving drum 20 cooperates with a suction drum 58 which serves to apply wrapper sheets 67 in a manner well known from the art of filter cigarette machines. Thus, the drum 58 supports the leading end of an elongated tape 65 which is stored on a reel 60 and is fed by a pair of advancing rolls 62, 63. The right-hand side of the tape 65 is coated with adhesive by a suitable paster 64 which includes a roller-shaped applicator 64a and a coating roll 64b dipping into a paste tank 64c. The leading end of the tape 65 is severed by the blades 68 of a rotary knife 66 which cooperates with the drum 58 to form the wrapper sheets 67. The peripheral speed of the drum 58 exceeds the speed of the tape 65 so that the sheets 67 are automatically staggered and are ready to be applied to successive assemblies 284A. At a station 70T, the assemblies 284A (each with a sheet 67 adhering thereto) are delivered into successive holders of a wrapping conveyor 70 which is provided with means for convoluting the sheets 67 around the respective assemblies 284A to form the mouthpieces 71. Such mouthpieces are delivered into the holders of a withdrawing conveyor 72 which deposits them on the upper stringer of a take-off belt 74 adapted to deliver the mouthpieces to storage or to a further processing station, for example, to a filter cigarette machine. The wrapping conveyor 70 may be of the type disclosed, for example, in my U.S. Patent No.

2,714,384 or in my copending application Ser. No. 269,027.

The holders of all conveyors shown in FIG. 2 are parallel with the axes around which the conveyors rotate. The distance between the holders of the conveyor 4 is the same as that between the holders of the conveyors 6, 14–17, 20, 52–54, 70 and 72. The distance between the holders 27 of the supply conveyor 26 is different. Also, all of the conveyors shown in FIG. 2, with the sole exception of the supply conveyor 26, are located in a common plane. The supply conveyor 26 is spaced axially from the transfer conveyors 52–54, and all of the conveyors with the exception of the supply conveyor 26 are driven at the same peripheral speed in a manner well known from the art of filter machines. The peripheral speed of the suction drum 58 is the same as that of the receiving conveyor 20, but the peripheral speed of the applicator 64a and advancing rolls 62, 63 is less. Since the supply conveyor 26 may be located at a considerable distance from the remaining conveyors, the parts of the apparatus may form two separate units which are connected to each other by the guides 400–402. In other words, if the construction of a filter machine is such that some of its parts must be accommodated at a considerable distance from the remaining parts, the apparatus of my invention may be used with great advantage because the fact that the magazine 22 and supply conveyor 26 must or may be located at a considerable distance from the remaining parts has no bearing on the efficiency of the apparatus.

Figure 4:
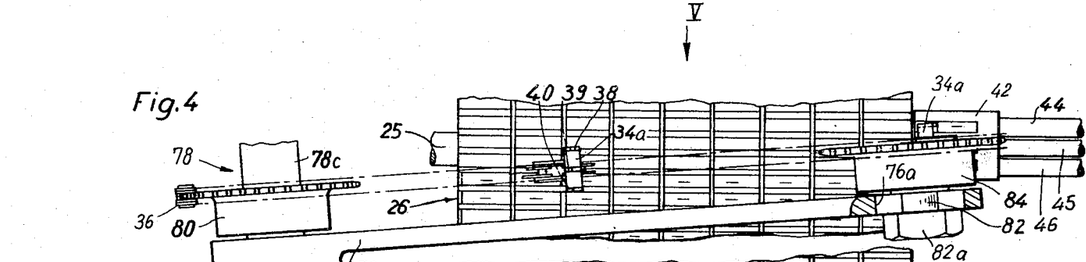
FIG. 4 is an enlarged fragmentary view of the structure shown in the left-hand portion of FIG. 3.
Figure 5:
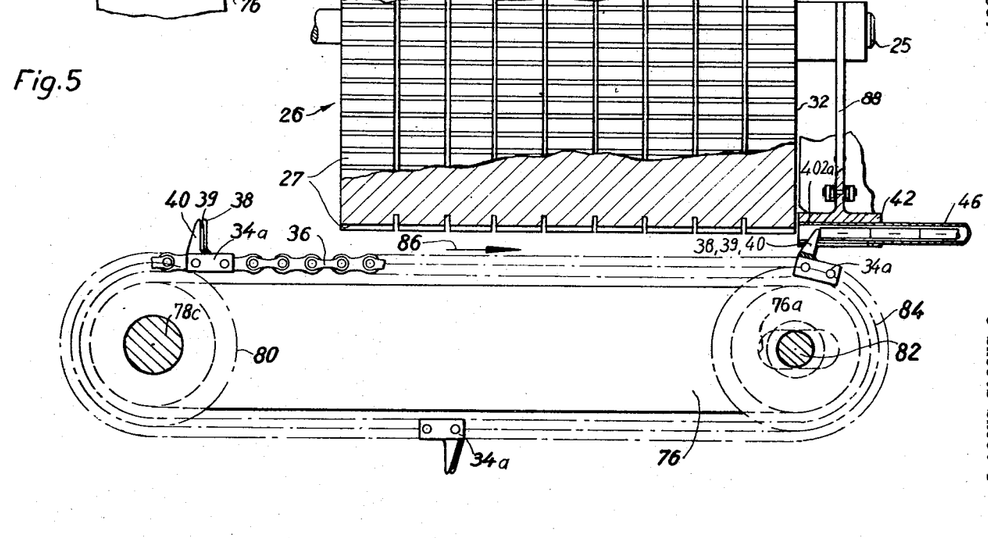
FIG. 5 is a view taken in the direction of arrow V in FIG. 4.
Figure 6:
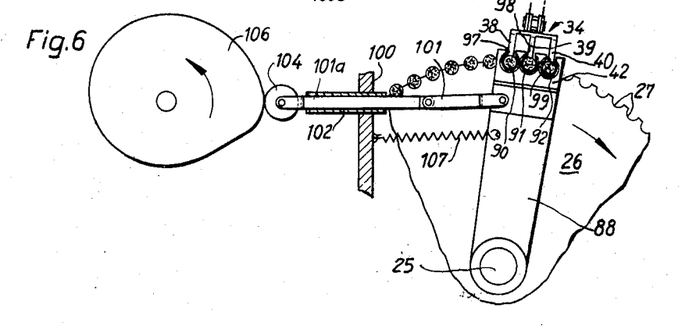
FIG. 6 is an enlarged fragmentary section, substantially as seen in the direction of arrows from the line VI—VI of FIG. 3, 4 or 5.
Figure 7:
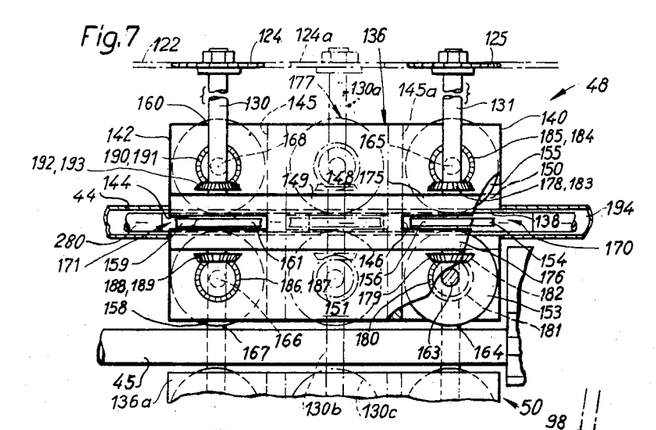
FIG. 7 is an enlarged side elevational view of a portion of the device which advances rows of articles in the paths defined by the guides.

The construction of the feeding device 34 which removes black sections from the holders 27 of the supply conveyor 26 and delivers such sections into the inlets 400a–402a of the guides 400–402 is illustrated in FIGS. 3 to 6. The shaft 25 carries a radially extending arm 88 which is free to oscillate thereabout and is adjacent to that end face (32) of the conveyor 26 which is nearer to the receiving conveyor 20, i.e., which is behind the plane of FIG. 2. The radially outer end of the arm 88 is connected with a block-shaped aligning member or header 42 which is provided with three separate bores 90, 91, 92 each of which may be brought in registry with one end of a holder 27. The bores 90–92 respectively receive the inlets 400a–402a of the guides 400–402. Each of these guides comprises three main portions including a flexible tubular portion 44, 45, 46, a block-shaped intermediate portion 48, 49, 50, and a rigid tubular discharging portion 194, 195, 196. The inlet 400a forms part of the flexible portion 44 and the outlet 400b forms part of the rigid portion 194. Analogously, the inlets 401a, 402a form part of flexible portions 45, 46 and the outlets 401b, 402b form part of rigid portions 195, 196. The distance between the inlets 400a–402a is selected in such a way that each thereof may register with a separate holder 27, i.e., if the bore 90 registers with the end of a first holder 27, the bores 91, 92 at the same time register with two adjacent holders 27. The header 42 is provided with three open slots 97, 98, 99 which communicate with and extend radially of the bores 90, 91, 92, respectively. As shown in FIG. 6, the slots 97–99 extend radially outwardly from the shaft 25 and may accommodate portions of shifting or displacing prongs 38, 39, 40 which form part of the feeding device 34.

Figure 3:
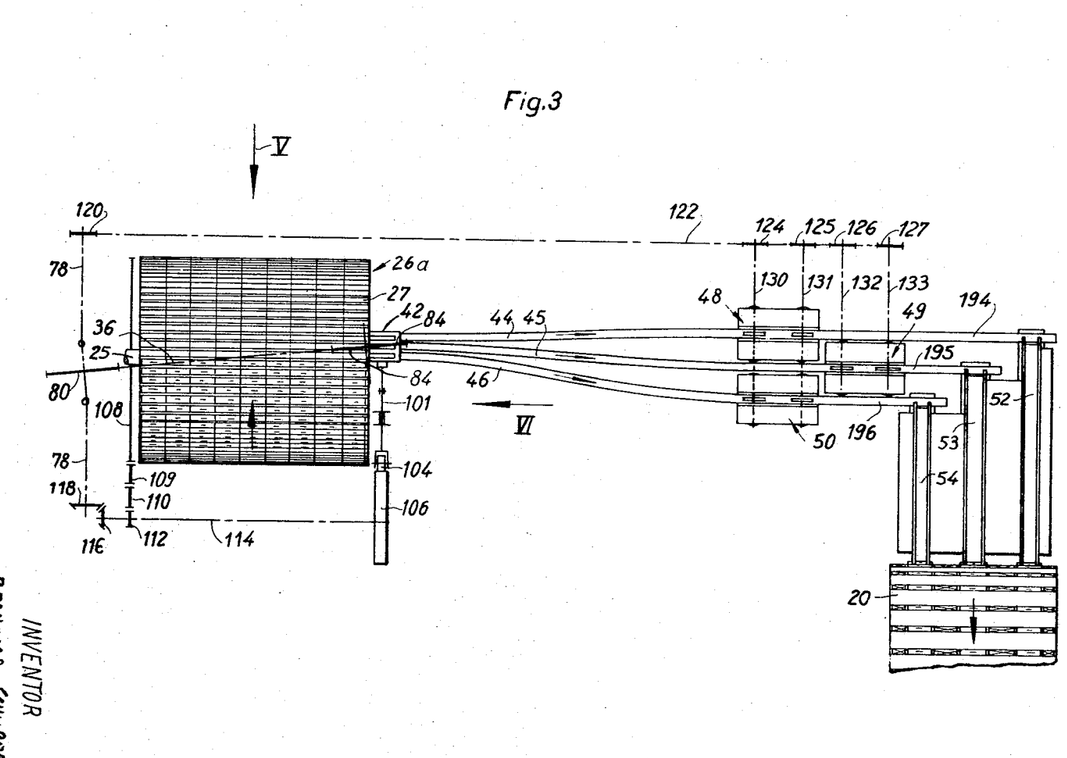
FIG. 3 is an enlarged fragmentary side elevational view of the apparatus, substantially as seen in the direction of arrow III in FIG. 2.

The arm 88 and header 42 may be oscillated by a mechanism which includes a disk-shaped cam 106 tracked by a roller follower 104 which is connected with one end of a linkage including a first link 101 coupled to the arm 88 and a second link 101a which is guided in a tube 102 extending through a stationary frame member 100. A spring 107 serves to bias the follower 104 against the periphery of the cam 106. One end of this spring is secured to the frame member 100 and its other end is attached to the arm 88.

FIGS. 4 and 5 illustrate an inclined supporting bracket 76 which is located at a level somewhat below the shaft 25 of the supply conveyor 26 and whose ends extend beyond the axial ends of this conveyor. That end of the bracket 76 which is distant from the header 42 supports the median portion 78c of a shaft 78 which is nearly normal to the shaft 25 and carries a sprocket wheel 80. The other end of the bracket 76 supports a second shaft 82 which is parallel to the shaft 78 and carries a second sprocket wheel 84. The shaft 82 is adjustable in an elongated slot 76a of the bracket 76 and may be arrested in a selected position of adjustment by a lock nut 82a, see FIG. 4. The bracket 76 and all elements mounted thereon form part of a mechanical conveying apparatus which in turn forms part of the feeding device 34. This mechanical conveying apparatus also includes an endless link chain 36 which is trained around the sprocket wheels 80, 84. The chain 36 supports three equidistant carriers or heads 34a each of which is provided with three outwardly extending displacing or shifting prongs 38, 39, 40. The distance between the prongs 38–40 on a head 34a is the same as the distance between three adjoining holders 27 or the distance between the slots 97, 98, 99 of the header 42. The distance between the heads 34a exceeds the axial length of the supply conveyor 26 and the chain 36 is driven to travel in a direction indicated in FIG. 5 by the arrow 86, i.e., the prongs 38–40 will travel along the periphery of the conveyor 26 while advancing toward the header 42 and will be held at a distance from the periphery of the conveyor 26 while advancing with the other stringer of the chain 36 to move from the sprocket wheel 84 back to the end turn around the sprocket wheel 80.

When the chain 36 is driven and the heads 34a travel along the upper stringer of the chain, as viewed in FIG. 5, the prongs 38–40 will extend into three adjoining holders 27 and will thereupon pass through the slots 97–99 of the header 42. The speed of the chain 36 is selected in such a way and the inclination of the bracket 76 is such that the tips of prongs 38–40 will remain in the corresponding holders 27 while the associated head 34a moves from the one to the other axial end of the conveyor 26 whereby the prongs expel three rows of black sections 280, 281, 282 and feed such sections into the inlets 400a, 401a, 402a.

The mechanism for driving the chain 36 in synchronism with the supply conveyor 26 is illustrated in FIG. 3 and includes a large gear 108 which is fixed to the shaft 25. The gear 108 drives two intermediate gears 109, 110 the latter of which meshes with a pinion 112 on a shaft 114 which is parallel with the shaft 25. The shaft 114 carries a cam 106 which oscillates the arm 88 for the header 42, and the shaft 114 also carries a bevel gear 116 which meshes with a second bevel gear 118 provided at one end of the shaft 78 for the sprocket wheel 80. The shaft 78 comprises the aforementioned rigid median portion 78c which is coaxially fixed to the sprocket wheel 80, two rigid outer portions 78b, and two Cardanic joints 78a which connect the outer portions 78b with the respective ends of the median portion 78c. The lower portion 78b is driven by the bevel gear 118 and the upper portion 78b drives a sprocket wheel 120 forming part of the advancing device which moves the black sections 280–282 in the guides 400–402. The shaft 82 for the sprocket wheel 84 is journalled in a stationary part of the frame structure.

The advancing device further comprises an endless link chain 122 which is trained around the sprocket wheel 120 and around a series of additional sprocket wheels 124, 125, 126, 127 shown in the upper right-hand portion of FIG. 3. The sprocket wheels 124–127 drive four shafts, 130, 131, 132, 133 which transmit motion to friction disks mounted in the intermediate portions 48, 49, 50 of the guides 400–402. The intermediate portions 48, 50 of the guides 400, 402 are located one above the other and the intermediate portion 49 of the guide 401 is located to the right of the portions 48, 50 so that the flexible portion 45 may pass at a level beneath the underside of the intermediate portion 48. It is not necessary that the entire portions 44, 45, 46 consist of flexible material as long as the inlets 400a–402a are free to follow oscillatory movements of the aligning header 42.

All three intermediate portions 48–50 are of identical construction; therefore, FIG. 7 merely shows the details of the portion 48 which forms part of the guide 400 and includes a symmetric block-shaped housing 136 of cruiform cross section, see particularly FIG. 2 of the drawings. The housing 136 is provided with a centrally extending through bore 138 which receives the ends of tubular portions 44 and 194 so that the black sections 280 must pass through the bore 138 in order to move from the interior of the portion 144 into the portion 194. The four equidistant legs 148, 149, 150, 151 of the housing 136 are provided with pairs of cutouts including the cutouts 145, 145a in the leg 148, cutouts 144, 146 in the leg 149, and analogous cutouts in the legs 150, 151. The cutouts 144, 145 extend inwardly from the front end face 142 and the cutouts 145a, 146 extend inwardly from the rear end face 140 of the housing 136. Each of these cutouts extends to the center of the housing and communicates with the central bore 138. The purpose of such cutouts is to accommodate rotary friction disks whose smooth peripheral surfaces come in direct engagement with the peripheries of black sections 280 and advance the sections into the rigid tubular portions 194 of the guide 400. There are a minimum of eight disks including friction disks 160, 155 in the cutouts 145, 145a of the leg 148, friction disks 161, 156 in the cutouts 144, 146 of the leg 149, friction disks 158, 153 in the cutouts of the leg 51 and friction disks 159, 154 in the cutouts of the leg 150. The friction disks 158–161 at one end of the housing 136 form a first cruciform structure 171, which engages the sections 280 from four sides and compels them to advance into the range of the second cruciform structure 170 which includes the disks 153–156 at the other end of the housing 136. The friction disks extend into the bore 138 and define between themselves two passages whose cross-sectional area is slightly less than is necessary for unobstructed advance of black sections 280. In other words, each section 280 is positively engaged by the friction disks of the structure 171 to be propelled into the range of the structure 170 and thereupon into the rigid tubular portion 194. The arrangement is preferably such that the compresion of black sections 280 need not exceed a small fraction of a millimeter, for example, it may be in the range of 0.1–0.2 mm.

The friction disk 156 in the cutout 146 of the leg 149 is mounted on the shaft 131 which extends through the upper panel 175 of the leg 149 and is driven by the sprocket wheel 125. The shaft 131 extends through the other panel 176 of the leg 149 and drives a bevel gear 179. A second bevel gear 178 which is also mounted on the shaft 131 is adjacent to the outer side of the panel 175. The panels 175, 176 are separated from each other by the cutout 146 and the bevel gears 178, 179 are closely adjacent to the outer sides of these panels. The friction disks 153, 154, 155, 158, 159, 160, 161 are respectively mounted on drive shafts 163, 164, 165, 166, 167, 168 and 130. The shafts 163–168 and 130 carry pairs of bevel gears 180–193 whereby the gears 178–184, 183–185, 179–180, 181–182, 186–188, 187–189, 190–192 and 191–193 mesh with each other to drive the corresponding friction wheels when the shafts 130, 131 rotate.

The shafts 164, 167 extend beyond the underside of the housing 136 and drive the friction disks in the housing 136a of the intermediate portion 50. As indicated in FIG. 7 by phantom lines, the housing 136 may accommodate additional friction disks 177 whose shafts are driven by a shaft 130a connected to a sprocket wheel 124a located between the sprocket wheels 124, 125 and driven by the chain 122. The same applies for the housings of the median portions 49 and 50. FIG. 7 merely shows a shaft 130b which is driven by the shaft 130a and extends into the housing 136a to drive a structure consisting of four friction disks 130c.

The friction disks insure that the rigid tubular portions 194, 195, 196 are filled with rows of black sections 280, 281, 282 despite the fact that the prongs 38–40 eject such sections intermittently. The length of the bore 138 (and of the corresponding bores in the housings of the intermediate portions 49, 50) is selected in such a way that the portion 44 will deliver a fresh row of sections 280 before the last section is advanced into the portion 194 so that the portion 194 remains filled at all times. In other words, the friction disks serve the dual purpose of advancing black sections 280 from the tubular portion 44 into the tubular portion 194 and of insuring that the sections in the tubular portions are arranged end-to-end. As a rule, the peripheral surfaces of the disks forming the cruciform structure 170 will slide along the periphery of a black section 280 excepting the interval immediately following removal of the foremost section 280' from the outlet 400b.

The friction disks may be replaced by circular brushes by endless belts or analogous advancing elements.

The construction, mounting and operation of the transfer conveyors 52, 53, 54 will be described with reference to FIGS. 8 to 11. As explained in connection with FIG. 3, the outlets 400b–402b of the rigid tubular portions 194–196 hold the foremost black sections 280'–282' of the rows in the guides 400–402 in such a way that the foremost sections are located in the path of transfer conveyors 52, 53, 54. These transfer conveyors deliver sections into the holders 20a of the receiving conveyor 20 in such a way that each holder 20a receives a section 280, a section 281 and a section 282. The transfer conveyors 52–54 will form three files of parallel sections which are spaced from each other and each section of any given file is moved into exact registry with a section of each other file not later than at the time when such sections enter a holder 20a.

Figure 10:
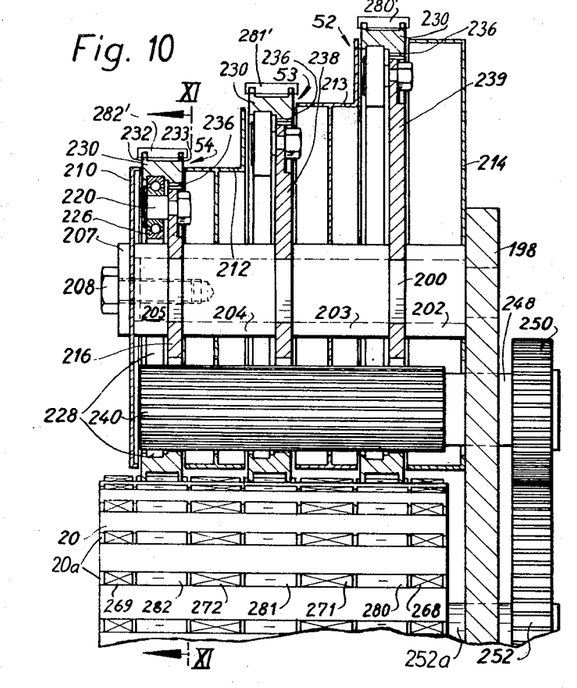
FIG. 10 is an enlarged fragmentary section, substantially as seen in the direction of arrows from the line X—X of FIG. 2.
Figure 11:
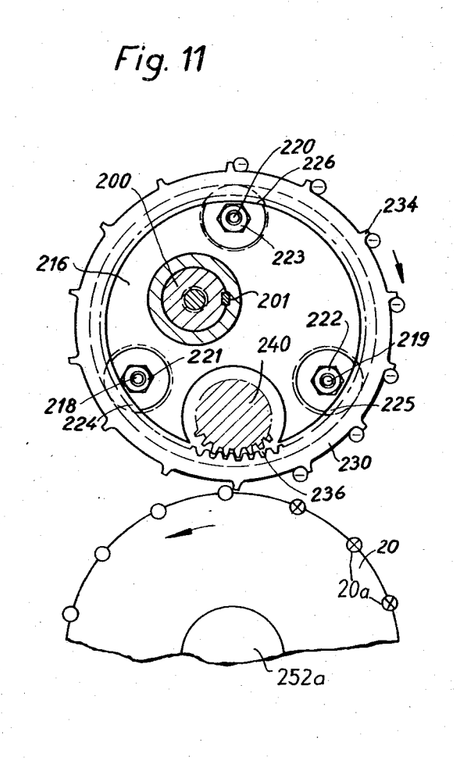
FIG. 11 is a section as seen in the direction of arrows from the line XI—XI of FIG. 10.

As shown in FIG. 10, the apparatus comprises a fixed frame member 198 which supports a horizontal stub shaft 200, and this stub shaft serves to support the transfer conveyors 52–54. FIG. 11 shows a key 201 which is recessed into the periphery of the shaft 200 and extends all the way to the frame member 198. The key 201 prevents rotation of parts which are mounted directly on the stub shaft 200. Such parts include a first spacer sleeve 202 which is immediately adjacent to the frame member 198, a first annular supporting member 239 which forms part of the conveyor 52, a second spacer sleeve 203, a second annular supporting member 238 which forms part of the conveyor 53, a third spacer sleeve 204, a third annular supporting member 216 which forms part of the conveyor 54, and a fourth spacer sleeve 205. The sleeve 205 is adjacent to a retaining washer 207 which is held by a bolt 208 driven into the left-hand end face of the shaft 200. A cup-shaped cover 210 is interposed between the sleeve 205 and washer 207 to serve as a lid for the open side of the transfer conveyor 54. The sleeves 202, 203, 204 are welded to covers 214, 213, 212 in such a way that the covers 213, 214 are adjacent to the sides of the supporting member 239 and the cover 212 is adjacent to one side of the supporting member 238.

The transfer conveyors are of different diameters but are otherwise of identical construction. Each comprises the aforementioned supporting member 216, 238 or 239, and each supporting member is provided with three equidistant circular openings which are adjacent to its periphery and accommodate bolts 218, 219, 220 held in position by nuts 221, 222, 223. Each bolt comprises a cylindrical head which supports the inner race of an antifriction bearing 224, 225, 226, respectively. The outer races of the bearings 224–226 extend into an internal groove 228 provided in an annular sleeve 230 which surrounds the respective supporting members 216, 238, 239. Thus, the sleeves 230 are free to rotate with reference to the supporting members and are automatically centered by the bearings 224–226 of the corresponding transfer conveyor. Each sleeve 230 is provided with a pair of axially spaced annular flanges 232, 233 which extend radially outwardly to define an annular groove. Each flange comprises a plurality of axially parallel equidistant entraining elements in the form of thin ribs 234 which serve to remove the foremost black sections 280', 281', 282' from the outlets 400b–402b. Each rib on the flange 232 is aligned with a rib 234 on the flange 233.

Each sleeve 230 is provided with a ring of internal teeth 236 which are adjacent to the internal groove 228 and mesh with the teeth of an elongated pinion 240 extending through suitable cutouts provided in the supporting members 216, 238, 239. The shaft 248 of the piston 240 extends through the frame member 198 and is connected with a pinion 250 which is driven by a gear 252. The gear 252 is mounted on the shaft 252a of the receiving conveyor 50.

Figure 8:
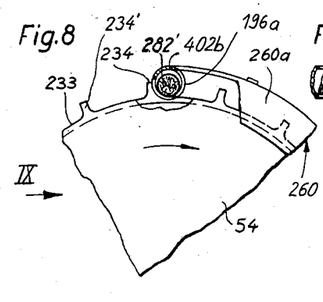
FIG. 8 is an enlarged sectional view, substantially as seen in the direction of arrows from the line VIII—VIII of FIG. 9, and illustrates a station at which the articles are removed from the outlet of a guide.
Figure 9:
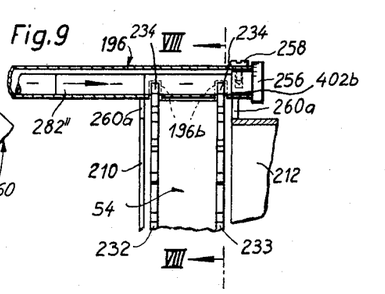
FIG. 9 is a fragmentary side elevational view, substantially as seen in the direction of arrow IX in FIG. 8.

FIGS. 8 and 9 show that the outlet 402b of the rigid tubular portion 196 (guide 402) extends very close to the periphery of the sleeve 230 on the transfer conveyor 54 and is provided with an axially extending cutout 196a which is wide and long enough to allow for removal of the foremost black section 282'. In addition, the outlet 402b is provided with two slots 196b which enable the ribs 234 to pass therethrough and into the interior of the outlet 402b. The free axial end of the outlet 402b is closed by an adjustable stop 256 which is retained by a radial screw 258. The position of the stops 256 will be changed if the operator desires to change the width of the gaps 274a, 275a or to use the apparatus in connection with black sections whose length is different from that of sections 280, 281, 282. The sleeve 230 of the transfer conveyor 54 is surrounded by an arcuate retaining shield 260 which holds the sections 282 in the pockets between the pairs of ribs 234 and insures that such sections are actually advanced toward the transfer station between the conveyors 54 and 20. The shield 260 is of U-shaped cross section and straddles a portion of the sleeve 230 on the conveyor 54. The side walls 260a of the shield 260 diverge conically outwardly in the proximity of the outlet 402b to make sure that the sections 282 will form a file of properly aligned rod-shaped articles.

The pinion 240 drives the sleeves 230 at the same peripheral speed but the sections 282 (issuing from the outlet 402b) will be compelled to travel in a shorter path than the sections 280, 281 because the diameter of the transfer conveyor 53 exceeds the diameter of the transfer conveyor 54 but is less than the diameter of the transfer conveyor 52. Thus, the file of sections 280 will travel in a longest arcuate path, the file of sections 281 will travel in a shorter arcuate path, and the file of sections 282 will travel in a shortest arcuate path. The diameters of the conveyors 52–54 are selected in such a way that a pair of aligned ribs 234 on the conveyor 54 will register with a pair of aligned ribs 234 on the conveyors 52 and 53 at the time such ribs are ready to transfer rod-shaped articles into successive holders 20a of the receiving conveyor 20. The distance between pairs of aligned ribs on any given sleeve 230 suffices to allow for continuous rotation of the conveyors 52–54 so that, and referring to FIG. 8, the pair of ribs marked 234 will remove the foremost black section 282' from the outlet 402b before the next pair of ribs 234' will enter the outlet and that sufficient time will elapse between removal of the section 282' and entry of ribs 234' into the slots 196b to allow the next section 282'' to enter the outlet 402b and to abut against the stop 256.

It is to be noted that the supply conveyor 26 of FIGS. 3 and 4 is provided with holders 27 which are long enough to accommodate rows consisting of any many as nine black sections 280, 281 or 282. On the other hand, FIG. 1 shows that each of the filter rods 285, 286, 287 is subdivided into three black sections 280, 281, 282. Such discrepancy is due to the fact that FIG. 1 is intended to show the steps of a simple method wherein the filter rods 266 and 285–287 are of sextuple unit length. It will be readily understood that the length of filter rods forming the rows 270 may be several times the length of filter rods 266, or vice versa. All that counts is that the number of gaps between the rod-like articles in the group 266A be the same as the number of guides, and the outlet of each guide is preferably positioned in such a way that it registers with one of the gaps between articles in the group 266A to make sure that there is no need for axial displacement of articles which are advanced by the transfer conveyors. Of course, if the supply conveyor is to receive black filter rods of eight, ten or more times unit length, the number of cutters must be increased to three, four or more, i.e., the number of cutters which cooperate with the supply conveyor 26 will be less by one than the total number of black sections which are obtained by subdividing a black filter rod.

The operation of the apparatus described in connection with FIGS. 2–11 will be readily understood by referring to the description of FIG. 1. Therefore, I will merely describe the operation of devices which affect the black sections 280–282 advance from the holders 27 of the supply conveyor 26 into the holders 20a of the receiving conveyor 20. When the shaft 114 (FIG. 3) rotates to drive the supply conveyor 26, the cam 106, and the chain 36, the prongs 38–40 of consecutive heads 34a advance in a direction from the left to the right and expel three rows of black sectioins by moving such sections lengthwise in a direction from the left-hand ends toward the right-hand ends of the respective holders 27. The drive for the conveyor 26 and chain 36 is synchronized with the drive for the drive for the arm 88 in such a way that the cam 106 keeps the bores 90–92 of the header 42 in registry with the respective holders 27 while a set of prongs 38–40 moves three rows of sections into the inlets 400a–402a of the guides 400–402. In other words, at the time a set of prongs 38–40 actually expels three rows of black sections, the follower 104 tracks a specially configured portion of the peripheral surface on the cam 106 to make sure that the header 42 is caused to travel at the exact speed of the conveyor 26 and retains the bores 90–92 in accurate registry with the holders 27 which are being emptied by a set of prongs 38–40. When the set of prongs 38–40 has moved beyond the right-hand ends of the holders 27 (which are then empty), the follower 104 begins to track another portion of the cam 106 which enables the spring 107 to return the header 42 to its starting position in which the bores 90–92 become aligned with the next three holders 27 (i.e., with the holders which are filled with black sections), and the next set of prongs 38–40 then begins to evacuate such sections into the inlets 400a–402a. The header 42 oscillates back and forth and is aligned with a given set of three fresh holders 27 while it moves in one direction. In such manner, the prongs 38–40 of consecutive heads 34a effect stepwise delivery of black sections into the guides 400–402 at a rate which suffices to insure that the rigid tubular discharge portions 194–196 of these guides are filled at all times for reasons which were explained in connection with FIG. 7. The interval between the time a set of prongs 38–40 has moved beyond the right-hand end face of the supply conveyor 26 and the time when the next set of prongs 38–40 enters the left-hand ends of three fresh (filled) holders 27 suffices for the cam 106 and spring 107 to move the bores 90–92 into accurate registry with the fresh set of holders 27, i.e., there is no waste in filter material because the chain 36 will effect systematic delivery of black sections into the guides 400–402. It is clear that the supply conveyor 26 is provided with suitable retaining means to insure that the black filter rods and their sections are held against the action of centrifugal force. For example, the conveyor 26 may be provided with suction ducts in a manner well known from the art of filter machines and filter cigarette machines.

The friction disks in the housings of the intermediate portions 48–50 may be driven at a peripheral speed which is about twice the speed of the prongs 38–40. These friction disks must be driven at a speed which is high enough to insure that there is enough room in the flexible tubular portions 44–46 to receive fresh rows of black sections 280–282 and that the rigid tubular sections 194–196 remain filled at all times (excepting, of course, for the very short intervals immediately following removal of the foremost black sections from the outlets 400b–402b).

When the foremost black section 282' leaves the outlet 402b (because it is entrained by a pair of ribs 234 shown in FIG. 8), the next foremost section 282'' is moved by the row of sections 282 in the rigid tubular portion 196 which are urged to move forwardly by the friction disks in the housing 136a of the intermediate portion 50, and such forward movement of the next foremost section 282' is completed before the ribs 234' enter the slots 196b. The foremost section 282' travels along the inner side of the shield 260 and is moved on to the transfer station between the conveyors 54, 20 to enter a holder 20a. The sections 280, 281 are transferred in similar fashion excepting that they cover distances of different length so that each thereof is aligned with one of the sections 282 at the time they enter a holder 20a. The thus obtained groups or rows 283 are then processed in a manner as described in connection with FIG. 1 (steps I–M).

The stops 256 arrest the foremost sections in the outlets 400b–402b in optimum position for engagement by the ribs 234 of sleeves 230 on the transfer conveyors 52–54. When a black section leaves the respective outlet, it is caused to travel sideways along the converging side walls 260a of the respective shield 260 and is moved into exact registry with one of the gaps 274–276 between the end filters 268, 269 and intermediate sections 271, 272 of a white group 266A. Of course, and as explained above, the peripheral surfaces of friction disks in the intermediate portions 48–50 will simply slide along a black section when the foremost section abuts against the corresponding stop 256. However, as soon as the foremost section is removed, the disks immediately advance the entire row of sections in the rigid tubular portion 194, 195 or 196 so that the next foremost section moves against the stop 256 before the next pair of ribs 234 is ready to enter the outlet.

Figure 12:
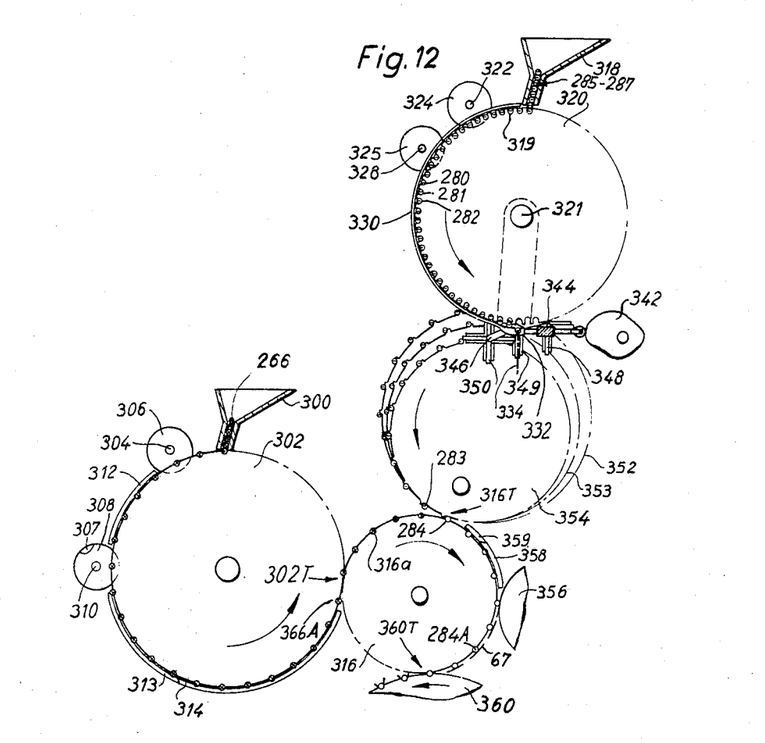
FIG. 12 is a diagrammatic fragmentary end elevational view of a modified apparatus.

FIG. 12 illustrates a portion of a second apparatus which may be utilized to practice the method of FIG. 1. This apparatus differs from the apparatus of FIG. 2 in that it is provided with a different feeding device which serves to deliver rows of black sections into the inlets of flexible tubular portions of elongated guides.

As shown in FIG. 12, the modified apparatus comprises a source or magazine 300 which contains a supply of white filter rods 266. Such filter rods descend seriatim into the holders of a conveyor 302 which cooperates with a cutter 306 mounted on a shaft 304 and serving to subdivide each rod 266 into a pair of white sections of triple unit length. The sections are shifted axially and away from each other by moving along the inclined faces of a wedge-like shifting or spreading cam 312 which is fixed to the frame structure and extends along a portion of the conveyor 302. The cam 312 replaces two of the spreading disks 14–17 shown in FIG. 2. The conveyor 302 cooperates with two additional cutters 307, 308 which are mounted on a shaft 310 and sever the sections of triple unit length so that each such section yields an end filter (268 or 269) and a white section (271 or 272). Thus, at the time it moves past the cutters 307, 308, each holder of the conveyor 302 accommodates a row of four coaxial rod-shaped articles which resemble the row shown at B in FIG. 1. Two additional shifting or spreading cams 313, 314 are mounted along the periphery of the conveyor 302 and serve to shift the end filters 268, 269 away from the sections 271, 272 or to move the sections 271, 272 away from the end filters 268, 269 so that, on reaching the transfer station 302T, each holder of the conveyor 302 accommodates a row or group 266A wherein the adjoining rod-shaped articles are separated by gaps 274–276. At the transfer station 302T, the groups 266A are delivered into successive holders 316a of a receiving conveyor 316 which corresponds to the receiving conveyor 20. It will be noted that the cams 313, 314 replace the remaining two of the spreading disks 14–17. In other words, the groups 266A are formed on the same conveyor which receives the rods 266 from the magazine 300.

A second source or magazine 318 accommodates a supply of black filter rods 285–287 which enter successive holders 319 of a supply conveyor 320 corresponding to the supply conveyor 26 of FIG. 3. This supply conveyor cooperates with two cutters 324, 325 which are mounted on shafts 322, 323 and serve to subdivide the rods 285–287 into rows of black sections 280, 281, 282. The conveyor 320 rotates about the axis of a shaft 321 and is surrounded by an arcuate retaining shield or shroud 330 which keeps the rods 285–287 and sections 280–282 in the respective holders 319. The transfer conveyors 352, 353, 354 are constructed in the same way as the conveyors 52–54 and serve to deliver files of parallel sections 280, 281, 282 sideways to a transfer station 316T where the sections enter the holders 316a of the receiving conveyor 316 and continue to move sideways. Cams 358, 359 correspond to cams 56, 57 of FIG. 2 and engage the end filters 268, 269 of successive assemblies 284 to transform such assemblies into condensed assemblies 284A which are ready to receive wrapper sheets 67 from a suction drum 356 corresponding to the suction drum 58. FIG. 12 also shows a portion of a wrapping conveyor 360 which is a functional equivalent of the conveyor 70 and completes the convoluting operation so that each assembly 284A will form a composite mouthpiece 71 of multiple unit length.

It is to be noted that the filter rods 266 and/or 285–287 may be replaced by composite mouthpieces of multiple unit length so that the ultimate product will be a composite mouthpiece which will consist of three or more different materials. This can be achieved by supplying the apparatus of FIG. 2 or 12 with composite mouthpieces produced in a similar apparatus or in an entirely different apparatus. Also, it is possible to fill the clearances 284a (FIG. 1) with measured quantities of activated charcoal or another comminuted filter material in a manner as disclosed, for example, in the copending application Ser. No. 384,131 of Carl Stelzer which is assigned to the same assignee. Furthermore, the clearances 284a may be wide enough to receive rod-shaped sections of a third filter material (for example, pellets consisting of bonded charcoal granulae or the like), and such sections of third filter material may be fed to the receiving conveyor 20 or 316 by an arrangement corresponding to the parts 2–17 of FIG. 2 or parts 300–314 of FIG. 12.

Figure 13:
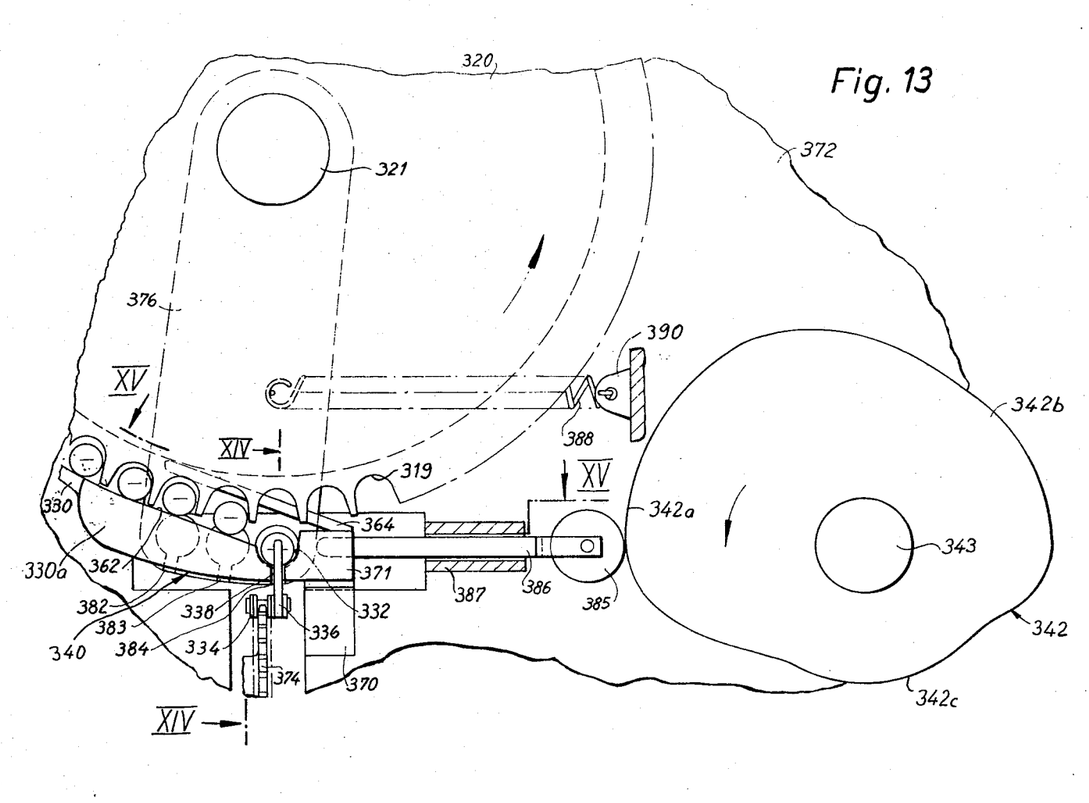
FIG. 13 is an enlarged view of a detail of the structure shown in FIG. 12.

Referring to FIG. 13, the lower end portion of the shield or shroud 330 forms an intercepting receptacle 330a having an inclined top face 362 which is substantially tangential to the periphery of the supply conveyor 320. The top face 362 is provided with a groove or channel 332 which is parallel to the holders 319 of the conveyor 320 and is slightly spaced from the periphery of this conveyor. Thus, as the stacks of black sections advance with the conveyor 320, they will slide along the top face 362 and the foremost stack will descend by gravity into the groove 332. The bottom wall of the intercepting receptacle 330a is provided with a vertical slot 338 which communicates with the groove 332 and extends the full length of the receptacle. In other words, the slot 338 corresponds to one of the slots 97, 98, 99 shown in FIG. 6.

An endless chain 334 is mounted at a level beneath the slot 338 and its stringers are located in a vertical plane so that the upper stringer is adjacent to and extends in the longitudinal direction of the slot 338. This chain carries a series of displacing prongs 336 which serve to expel rows of black sections from the groove 332. The distance between the prongs 336 exceeds the axial length of the supply conveyor 320, and the prongs travelling with the upper stringer of the chain 334 will extend into the slot 338 as well as into the groove 332. The chain 334 is trained around two sprocket wheels one of which, namely, the sprocket wheel 374, is shown in FIGS. 13 and 14.

The feeding device further comprises an oscillatable header 340 which is mounted at the outer end of a radial arm 376, and this arm is rotatable on the shaft 321 of the conveyor 320. The means for oscillating the header 340 comprises a cam 342 which is mounted on a shaft 343 and cooperates with a roller follower 385. The follower 385 is mounted at one end of a push rod 386 which is slidable in a tubular frame portion 386 and bears against the header 340. A spring 388 is connected with the arm 376 and with a stationary lug 390 and serves to keep the follower 385 in engagement with the periphery of the cam 342.

The guides of the apparatus shown in FIG. 12 comprise three flexible tubular portions 344, 345, 346 whose inlets 380, 379, 378 are received in suitable bores of the header 340 (see FIGS. 14 and 15) and which are but need not be spaced from each other the same way as three adjoining holders 319 on the supply conveyor 320. The tubes 344, 345, 346 are connected to three median portions 348, 349, 350 (see FIG. 12) which correspond to the median portions 48, 49, 50 of the guides 400–402. The median portions 348–350 are connected with rigid tubular portions (not shown) which correspond to the tubular portions 194–196 of the guides 400–402 and extend to the transfer conveyors 352, 353, 354.

Figure 14:
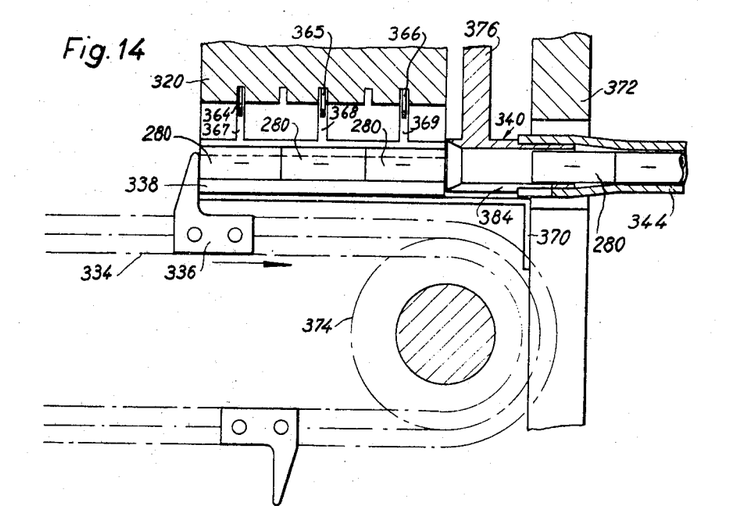
FIG. 14 is a fragmentary section as seen in the direction of arrows from the line XIV—XIV of FIG. 13.
Figure 15:
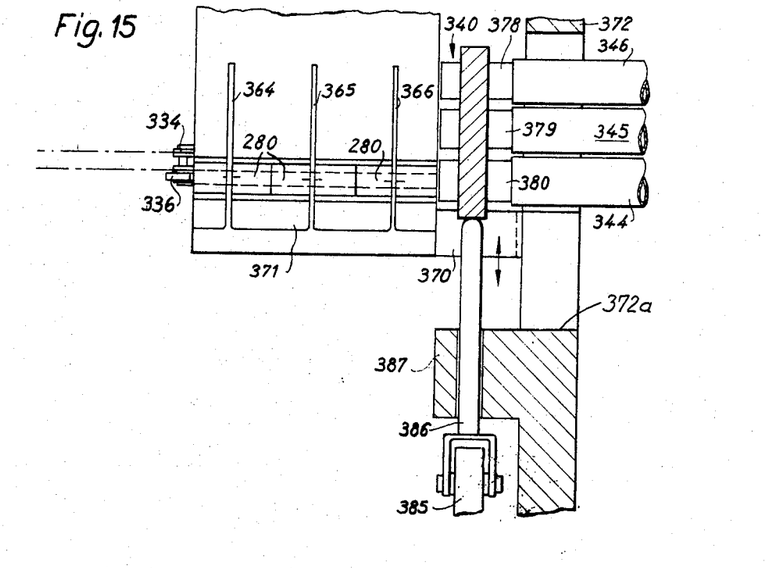
FIG. 15 is another fragmentary section, substantially as seen in the direction of arrows from the line XV—XV of FIG. 13.

The intercepting receptacle 330a at the lower end of the retaining shield 330 carries three rails 364, 365, 366 which extend into circumferential grooves 367, 368, 369 of the supply conveyor 320, see particularly FIGS. 14 and 15. The rails extend in a direction counter to that in which the conveyor 320 rotates, i.e., in a clockwise direction as viewed in FIG. 12 or 13. Since the slot 338 divides the intercepting receptacle 330a into a pair of separate parts, the right-hand part 371 of this receptacle is fixed to an angular bracket 370 which is supported by a frame member 372 having a slot 372a through which the inlets 378–380 extend with sufficient clearance to allow for oscillation of the header 340.

Each of the inlets 378–380 may be moved in accurate registry with one end of the groove 332 in the intercepting receptacle 330a, and such movements of the inlets (namely, of the header 340 and arm 376) are effected by the spring 388 in cooperation with the cam 342. FIG. 13 shows that the lower portions of the inlets 378–380 are provided with axially extending slots 382, 383, 384 which enable the prongs 336 to move beyond the respective axial end of the supply conveyor 320 before they begin to travel around the corresponding end turn of the chain 334.

The apparatus of FIG. 12 operates as follows:

When the conveyor 302 rotates, white filter rods 266 are moved past the cutters 306, 307, 308 to yield white end filters and white intermediate sections. Such end filters and sections are moved apart by the spreading cams 312, 313, 314 to form groups 266A which reach the transfer station 302T and enter the holders 316a of the receiving conveyor 316. The supply conveyor 320 receives a succession of black filter rods 285–287 from the magazine 318 and moves them past the cutters 324, 325 to form rows of black sections 280, 281, 282 which remain in the corresponding holders 319 because they move along the inner side of the arcuate shield 330 and on to the inclined top face 362. While moving along the top face 362, the foremost row leaves the corresponding holder 319 and enters the groove 332. As soon as the groove 332 is filled, one of the prongs 336 enters the slot 338 and moves the row into the momentarily aligned inlet 380, see FIGS. 14 and 15. Thus, the sections 280 are fed into the flexible tubular portion 344 and push before them the row of sections 280 which are already accommodated in the flexible portion 344.

When the groove 332 is empty and the prong 336 has moved into the slot 384, the next holder 319 discharges a row of black sections 281 which are thereupon engaged by the next prong 336 to be moved lengthwise into the inlet 379 of the flexible tubular portion 345. As soon as the preceding prong 346 leaves the slot 384 of the inlet 380, the cam 342 cooperates with the spring 388 to move the inlet 379 into accurate registry with the corresponding end of the groove 332 so that the row of sections 281 may be expelled from the groove 332 in the same way as described in connection with the row of sections 280. The row of sections 282 will enter the groove 332 as soon as the sections 281 are delivered into the tubular portion 345 and the next following prong then effects axial displacement of sections 282 into the tubular portion 346 whose inlet 378 is moved into accurate alignment with the corresponding end of the groove 332 just in time to avoid uncontrolled escape of sections 282. It is to be noted that the cam 342 comprises three arcuate portions 342a, 342b, 342c whose centers of curvature are located on the axis of the shaft 343 and which prevent oscillation of the arm 376 at the time the inlets 378, 379, 380 should register with the groove 332, i.e., while the sections 280, 281, 282 are being moved lengthwise into the corresponding guides.

The rails 364, 365, 366 act as a stripping device and insure that all of the black sections are removed from the corresponding holders 319 to roll along the inclined top face 362 of the intercepting receptacle 330a and into the groove 332. It will be seen that the main difference between the feeding devices of FIGS. 3 and 13 is that the latter will shift one row at a time whereas the device 34 shifts three rows in a simultaneous operation.

The rows of black sections in the tubular portions 344, 345, 346 advance toward the median portions 348, 349, 350 and the foremost black sections reach the outlets of the corresponding guides to be removed sideways by the transfer conveyors 352, 353, 354 in the same way as described in connection with FIGS. 8 and 9. Such successively removed foremost black sections form on the conveyors 352–354 three spaced files of parallel sections which travel sideways at the same speed but in paths of different length to reach the holders 316a of the receiving conveyor 316. At the transfer station 316T, the foremost black section on the transfer conveyor 352 is in axial alignment with the foremost black section on the transfer conveyors 353, 354 so that such foremost sections form a row or group 283 which is shuffled with a group 266A to form an assembly 284. On moving along the condensing cams 358, 359, the assemblies 284 are condensed to form assemblies 284A which are thereupon provided with wrapper sheets 67 and move on to the transfer station 360T to be delivered into successive holders of the wrapping conveyor 360 which completes the wrapping operation and forms composite mouthpieces 71 in the same way as described in connection with FIG. 2.

The drive for the advancing device of FIGS. 13–15 is analogous to the drive for the advancing mechanism 34. Thus, the peripheral speed of the conveyor 320 is synchronized with the speed of the chain 334 and with the rotational speed of the shaft 343. If desired, the supply conveyor 320 may rotate intermittently.

The mechanical advancing device of FIGS. 3 and 7 may be replaced by other types of advancing devices. For example, each guide may constitute a pneumatic conveyor in which the rows of sections are advanced by compressed air or by suction. It is also possible to construct the guides in such a way that a portion of each guide will constitute a pneumatic conveyor. Referring to FIG. 3, the rigid portions 194–196 of the guides 400–402 may constitute pneumatic conveyors. However, when the guides are constructed in a manner as actually shown in the drawings, they perform the sole function of properly supporting, guiding and protecting the corresponding rows of black sections. Cutouts provided in such guides serve the purpose of permitting removal of sections and of permitting the friction wheels to engage and advance the sections end-to-end so that the sections form elongated rows.

I claim:

1. Apparatus for manipulating sections of filter rods and similar rod-shaped articles, comprising, a supply conveyor having a series of holder means each arranged to support and to advance sideways a row of at least two coaxial rod-shaped articles; a plurality of tubular guides each having an outlet remote from and an inlet adjacent to successive holder means; displacing means for displacing the articles lengthwise from said holder means into said guides and for advancing the thus displaced articles lengthwise through the respective guides; a receiving conveyor having a series of article-receiving holders arranged to move the articles sideways; and transfer means for delivering articles from the outlets of said guides into the holders of said receiving conveyor.

2. Apparatus as defined in claim 1, wherein said rod-shaped articles are obtained by subdivision of rods of multiple article length and wherein said supply conveyor comprises a rotary drum, said holder means being provided on the periphery of and being parallel with the axis of said drum, and further comprising a source of rods of multiple article length adjacent to said drum and having outlet means for delivery of rods into said holder means, and cutter means adjacent to said drum intermediate said source and said displacing means for subdividing successive rods into rows of coaxial articles.

3. Apparatus as defined in claim 1, wherein the distance between adjoining holder means equals the distance between adjoining inlets, said inlets being adjacent to the path of movement of said holder means and being arranged to register simultaneously with successive holder means of said supply conveyor so that said guides can receive articles at the same time.

4. Apparatus as defined in claim 1, wherein each of said rows contains the same number of articles and the number of said guides equals the number of rod-shaped articles in a row, each of said guides being arranged to register temporarily with successive holder means of said supply conveyor simultaneously with each other guide.

5. Apparatus as defined in claim 4, wherein said displacing means is arranged to displace full rows of articles into the registering guides.

6. Apparatus as defined in claim 1, wherein the outlets of said guides are spaced from each other.

7. Apparatus as defined in claim 1, wherein said transfer means comprises means for moving the articles sideways.

8. Apparatus as defined in claim 7, wherein said transfer means comprises a plurality of rotary conveyors each having axially parallel holder means for entraining the articles from one of said outlets to the holders of said receiving conveyor.

9. Apparatus as defined in claim 1, wherein said guides are flexible.

10. Apparatus as defined in claim 1, wherein said displacing means comprises means for pneumatically conveying articles through said guides.

11. Apparatus as defined in claim 1, wherein said supply conveyor comprises a drum rotatable about a horizontal axis and further comprising intercepting means disposed below said drum for supporting articles which leave said holder means by gravity, said displacing means comprising means for shifting articles lengthwise from said intercepting means into said guides.

12. Apparatus as defined in claim 11, wherein said intercepting means forms part of a shroud surrounding a portion of said drum.

13. Apparatus as defined in claim 1, further comprising stop means adjacent to the outlets of said tubes to arrest the foremost articles in the respective tubes in registry with said transfer means.

References Cited

UNITED STATES PATENTS 2,912,987   11/1959   Molins et al. _________ 131—94

JAMES M. MEISTER, Primary Examiner

U.S. Cl. X.R.

83—158, 411; 198—31, 32